July 15, 1924.
C. C. RICH
SLAB FOR USE IN PASTING BATTERY GRIDS
Filed July 20, 1923    2 Sheets-Sheet 1
1,501,809
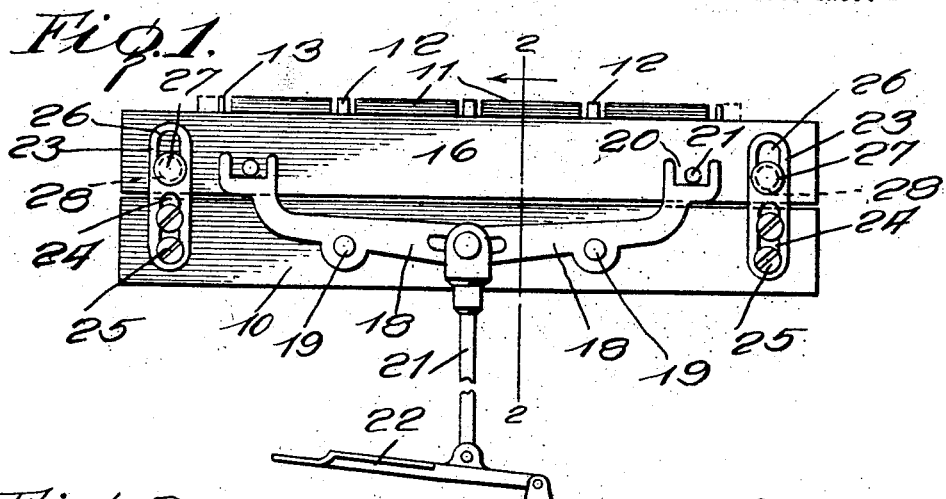
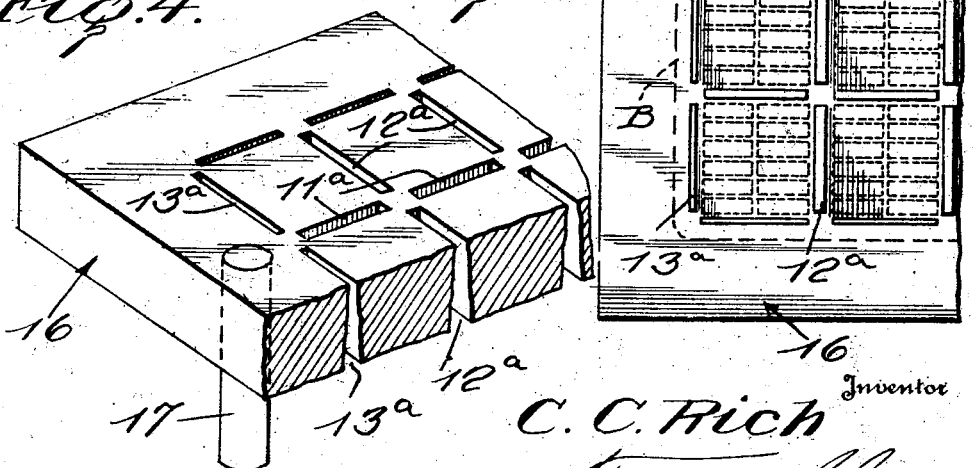
Inventor
C. C. Rich
By Frederick S. Stitt
Attorney July 15, 1924.
C. C. RICH
1,501,809
SLAB FOR USE IN PASTING BATTERY GRIDS
Filed July 20, 1923   2 Sheets-Sheet 2
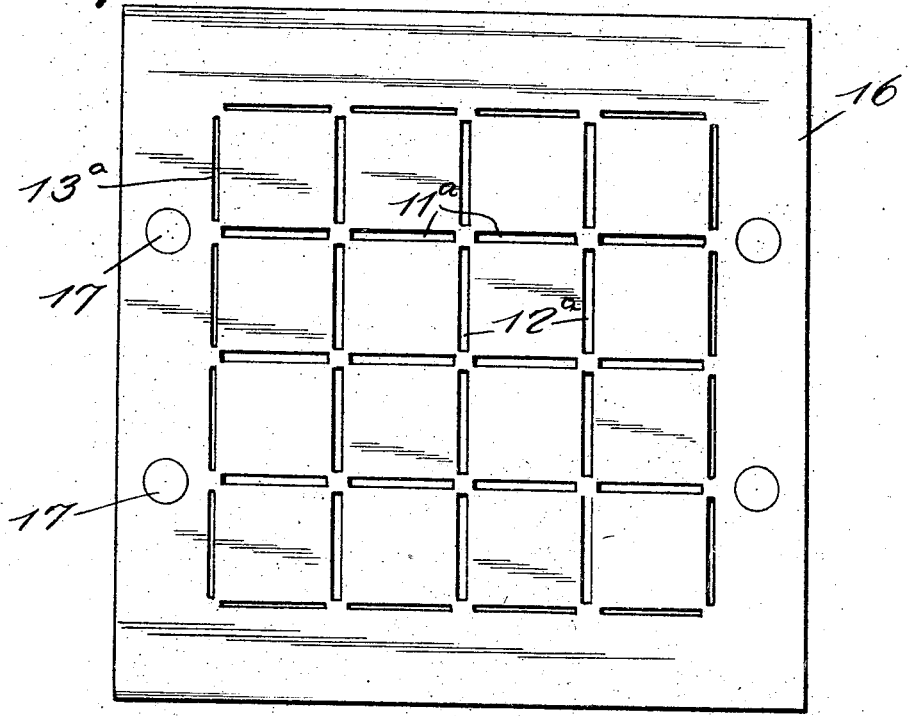
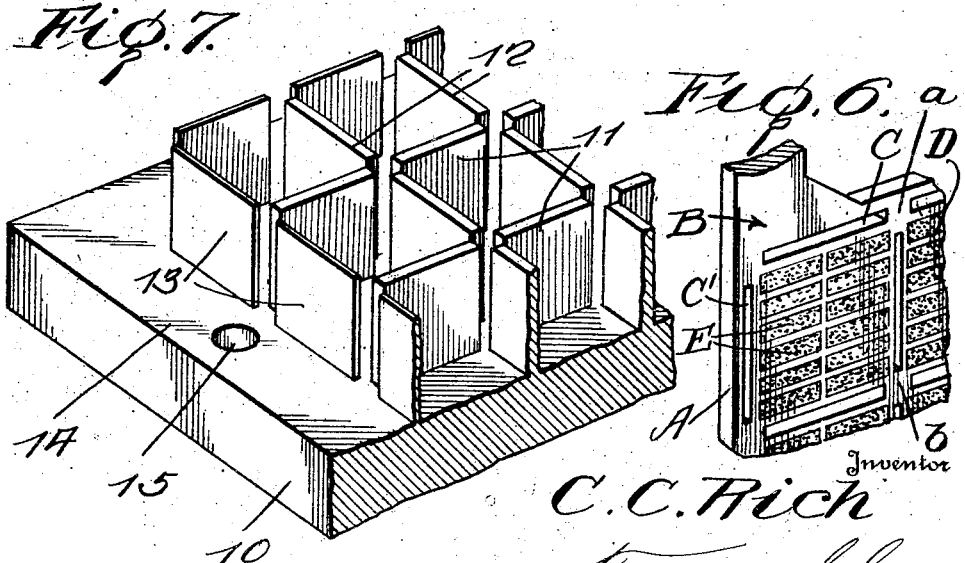

Patented July 15, 1924.

1,501,809

UNITED STATES PATENT OFFICE.

CHARLES CLAYTON RICH, OF MOUNT VERNON, NEW YORK, ASSIGNOR OF ONE-TWENTIETH TO CHARLES WINTERMEYER, OF MOUNT VERNON, NEW YORK.

SLAB FOR USE IN PASTING BATTERY GRIDS.

Application filed July 20, 1923. Serial No. 652,795.

*To all whom it may concern:*

Be it known that I, CHARLES CLAYTON RICH, a citizen of the United States, residing at Mount Vernon, in the county of Westchester and State of New York, have invented certain new and useful Improvements in Slabs for Use in Pasting Battery Grids, of which the following is a specification.

This invention relates to means for filling storage battery plate grids with paste, that is with electro-active material or material which will be electro-active when placed within electrolyte, and the invention particularly relates to a means for pasting storage battery grids of the character described in my pending application for patent, Serial #646,609, filed June 20, 1923.

In this application for patent, there is disclosed a storage battery plate in which the grids forming the plate are so formed as to provide a plurality of compartments or pockets wherein the electro-active material or paste is disposed or is intended to be disposed, certain openings being left unfilled with paste within the boundaries of the marginal frame of the plate to thereby permit expansion of the individual grids without distortion of the plate or buckling. The details or construction of this grid and the object of the grid are fully illustrated and claimed in my pending application for patent.

In the ordinary practice of pasting storage battery plate grids, they are pasted manually, that is by hand, and few manufacturers perform this step partly by machine and partly by hand, but well made hand pasted plates are generally considered to be of superior quality. In common practice the method employed is to lay the plate grid flat down upon a smooth surface, such as a slab of hard rubber, wood or glass, to then apply and work in the paste with a suitable implement, and when the pasting is completed to remove the pasted grid from the pasting slab by sliding the pasted grid edgewise over the face of the slab. The edgewise sliding movement is necessary for the reason that if the pasted grid be lifted from the pasting slab, a part of the paste is almost certain to become detached from the plate grid and remain attached to the pasting slab, thereby rendering the pasted grid defective. This result is obviated by removing the pasted plate grid by sliding it edgewise over the smooth plane working surface of the pasting slab.

If a plate grid of the character described in my pending application before referred to were to be pasted in the manner above stated, the slots, apertures or openings through the plate which are designed to be left unfilled with paste to permit expansion would become filled with paste, or it would be extremely difficult to prevent these expansion apertures from becoming filled and it would be necessary to perform the further step, after the plate was pasted, of removing the excess paste from the parts of the plate grid which are intended to be left open or unfilled.

The general object of my present invention, therefore, is to provide a filling slab, as it may be termed, or equivalent mechanism which will permit the pockets or compartments of the plate to be readily filled with paste but which will prevent the filling of the expansion slots, apertures or other openings of like character with paste.

A further object is to so construct this slab or device that after the plate has been filled it may be slid off edgewise from the working face of this improved pasting slab.

A still further object is to provide a pasting slab which is formed in two parts, the two sections of the slab being shiftable toward or from each other to a limited degree, and provide one of these sections with slots corresponding to the expansion slots or openings of the battery plate, and provide the other section with projecting portions or filling members which, when the two plates are in full contact, will fill the expansion slots or other openings and project slightly beyond these slots or openings, the construction being such that when the two sections are slightly shifted away from each other these filling pieces will be brought flush with the surface of the other section so as to form a plane faced, smooth slab from which the battery plate may be removed after being fully pasted by an edgewise sliding movement.

Other objects have to do with the means for shifting the two sections of the slab toward or away from each other and the means for adjustably limiting the relative movement of these two sections of the slab.

Other objects will appear in the course of the following description.

My invention is illustrated in the accompanying drawings, wherein:—

Figure 1 is a side elevation of my invention;

Figure 2 is a transverse sectional view thereof on the line 2—2 of Figure 1;

Figure 3 is a fragmentary top plan view;

Figure 4 is a fragmentary perspective view of one of the sections of the device;

Figure 5 is a plan view thereof;

Figure 6 is a fragmentary perspective view of a battery plate;

Figure 7 is a similar view of the base section of the device;

In Figure 6, I have illustrated a portion of a battery plate such as is illustrated in my co-pending application before referred to, wherein the battery plate, which is designated generally A, is formed to provide a rectangular frame within which is fitted a series of grid sections B, each of these grid sections being also rectangular and contacting with the frame at the corners of the grid sections entirely, as at $a$, the grid sections also contacting with each other at the corners, as at $b$, thus leaving a plurality of vertical and horizontal slots C at the top, bottom and slots C' at the sides of each grid section to permit the individual expansion of the grid sections and, therefore, prevent the warping of the entire battery plate.

It will be noticed that all of the slots C have a definite width and length but that there are slots C' extending vertically at the sides of the battery frame plate A which are narrower than the slots C. It will also be seen that each grid has intersecting webs D which provide a plurality of pockets or compartments within which the paste E is disposed. It is obvious that in applying paste to this battery plate, the slots C and C' must be left open.

In order to carry out the purpose stated, I provide what I will term a base section 10, which may be made of any suitable material, preferably material which is practically non-corrosive in the presence of the paste to be used, this section 10 having any desired thickness and having upstanding from it the rectangularly arranged ribs or webs 11, 12 and 13. The webs 11 and 12 have a thickness approximately equal to the width of the slots C in the battery plate, while the web or rib 13 has a thickness equal to the slot C'. These webs or ribs 11, 12 and 13 define rectangular spaces within which the individual battery grid sections B fit. The bottom of this section 10 extends outward, as at 14, and has a plurality of apertures 15 extending entirely through it.

Coacting with this base section 10 is a section 16 which is likewise made of preferably non-corrosive material, the upper surface of this section being flat and smooth. This section is provided with a plurality of pins 17 which are adapted to be inserted through the openings 15 to thereby bring the two plates in absolutely proper register. The plate or section 16 is formed, as illustrated, with a plurality of slots $11^a$, $12^a$ and $13^a$ corresponding to the webs of ribs 11, 12 and 13 on the section 10 so that when the section 16 is moved downward on the section 10 into the position shown in Figure 2, the webs 11, 12 and 13 will extend upward through the slots $11^a$, $12^a$ and $13^a$.

It will be noted that the section 16 has a depth less than the depth or height of the ribs or webs 11, 12 and 13 so that when this section 16 is fully moved downward upon the flanges 14, as illustrated in Figure 1, the ribs or webs 11, 12 and 13 will project up above the face of the section 16 a distance equal to the thickness of the battery plate A, and it will be also seen, of course, that with this construction the plate or section 16 may be raised or shifted outward from the section 10 to a degree which will bring the smooth outer face of the section 16 exactly flush with the ends of the ribs or webs 11, 12 and 13. Preferably, though I do not wish to be limited to this, the slots $11^a$, $12^a$ and $13^a$ will gradually increase in cross section downward so as to provide clearance for the webs 11, 12 and 13, or the slots $11^a$, $12^a$ and $13^a$ may be of even width throughout their height but the webs 11, 12 and 13 may be tapered toward their outer ends so as to provide for this clearance. It will be seen that proper clearance may be provided either by reducing the cross sectional area of the webs or increasing the width of the slots beginning at a point below the upper faces of the webs or by tapering the webs or tapering the slots, or both.

I do not wish to be limited to any particular means for shifting the section 16 toward or from the section 10, but I have illustrated for this purpose the ends of section 10 as being provided with levers 18 which are pivoted upon pins 19, these levers at their outer ends having a relatively elongated recess 20 constituting seats for pins 21 projecting outward from the ends of the section 16. The inner ends of the levers 18 are slotted and operatively connected to operating rods 21, which in turn may be connected to a treadle 22 or to any other suitable operating means.

It will be obvious now that as the rod 21 is shifted upward, the inner ends of the levers 18 will be raised and the outer ends lowered and that this will permit the lowering of the section 16 onto or against the face of the section 10, and that when the inner ends of the levers 18 are drawn downward, the outer ends will be forced upward and this will lift the section 16 off the section 10. As before remarked, the section 16 will only be lifted to such a height that the upper face of the section 16 is exactly flush with the upper end faces of the webs or ribs 11, 12 and 13, and to this end I may provide any suitable limiting stops to limit the relative movement of the members 10 and 16. I have illustrated for this purpose, however, slotted yokes 23, each yoke having a slot 24 through which screws 25 pass into the corresponding end of the section 10, the upper portion of this yoke having a slot 26. A guide screw 27 passes through this slot 26 into the side face of the section 16. This screw is formed with a shoulder 28 which limits the inward movement of the screw by bearing against the end face of the section 16 so that the head of the screw cannot bind upon the slotted yoke. By adjusting the yoke by means of the screws 25, it is possible to very exactly limit the relative movements of the sections 10 and 16 away from each other so as to bring the upper face of the plate or section 16 exactly flush with the upper edge faces of the webs 11, 12 and 13. In actual practice the plate or section 16 does not rest flat against the section 10 but an appreciable space is left between the two sections 10 and 16 when the section 16 is in its lowermost position to provide clearance for dirt, etc.

It is to be understood that I do not wish to be limited to a stationary lower and a movable upper section but, on the contrary, the upper section may be held stationary and the lower section may be moved, or both of said sections may be made to approach or recede from each other. Neither do I wish to be limited to the means which I have illustrated for the purpose of relatively moving the sections, as it is obvious that many different means might be used for this purpose without departing from the spirit of the invention.

The operation of this device is as follows: When ready to paste plate grids of the type for which this device is particularly adapted, such as is illustrated in my co-pending application, and in Figure 6 of the present application, adjustments are so made by means of the adjustable stops consisting of the yokes 23 and the screws 25 and 27, that when sufficient power is applied through the lever arms to raise the upper section of the slab to its extreme extent of movement, the upper faces of the ribs or webs 11, 12 and 13 will be just flush with the upper or working face of the upper section 16. When the section 16 is permitted to lower relative to the section 10, the stops formed of the members 23 and 27 will check the amount of movement at such a point as will leave the webs or ribs 11, 12 and 13 projecting from the upper or working surface of the plate 16 a sufficient distance to be practically flush with the upper face of the plate grid to be pasted, when the said plate grid is laid flat down upon the slab 10, as illustrated in Figure 1.

Assuming that the plate grid is lying flat down upon the upper face of the section 16 with the webs 11, 12 and 13 extending up through the slots in the plate grid and flush with the upper face of said plate grid, the paste is applied and worked into the plate grid and smoothed off in the usual manner. When this has been accomplished, the section 16 is raised (or the section 10 lowered as the case may be) until the stops check the relative movement of the two plates 10 and 16 and this movement of the plate is stopped when the upper face of the webs 16, 12 and 13 are just flush with the upper face of the section 11, thus forming in effect a smooth surface in one plane which permits removing the pasted plate grid by an edgewise sliding movement.

The essential feature of my invention consists of a slab section or plate having at least one substantially plane surface provided with outstanding projections adapted to extend into openings, slots or apertures which are to be left unfilled in battery plates or a slab consisting of two sections, one being perforated and the other having projections designed to pass through and extend beyond the working face of the perforated section, these two sections being shiftable so as to bring these projecting portions flush with the face of the upper section.

I claim:—

1. Means used in pasting battery plates having certain apertures not designed to be filled with paste comprising a slab having a flat working surface upon which the battery plate may be placed, said flat surface having projections formed to fill the said apertures in the battery plate when the battery plate is laid upon the slab.

2. Means used in pasting battery plates having certain apertures not designed to be filled with paste comprising a slab having a flat upper surface, and a member having projections formed to fill the said apertures in the battery plate when the battery plate is laid upon the slab, said member being withdrawable from the slab to bring the projections flush with the surface of the slab.

3. Means used in pasting battery plates having certain apertures not designed to be filed with paste comprising a slab formed of two sections, one adapted to be superimosed upon the other, one of said sections having a flat upper face upon which the battery plate is adapted to be laid and having apertures therein corresponding to and registering with the said apertures in the battery plate which are not to be filled, the other section having projections formed to fill said apertures and projecting beyond the face of the first named section and into the said apertures of the battery plate.

4. Means used in pasting battery plates having certain apertures not designed to be filled with paste comprising a slab formed of two sections, one adapted to be superimosed upon the other, one of said sections having a flat upper face upon which the battery plate is adapted to be laid and having apertures therein coresponding to and registering with the said apertures in the battery plate which are not to be filled, the other section having projections formed to fill said apertures and projecting beyond the face of the first named section and into the said apertures of the battery plate, the sections being shiftable away from each other to withdraw the projections from engagement with the battery plate.

5. Means used in pasting battery plates having certain apertures not designed to be filled with paste comprising a slab formed of two sections, one adapted to be superimposed upon the other, one of said sections having a flat upper face upon which the battery plate is adapted to be laid and having apertures therein corresponding to and registering with the said apertures in the battery plate which are not to be filled. the other section having projections formed to fill said apertures and projecting beyond the face of the first named section and into the said apertures of the battery plate, the sections being shiftable away from each other to thereby carry the projections into such position that the faces of the projections shall be flush with the working face of the other section to thereby permit the battery plate to be shifted off of the slab by a sidewise movement.

6. Means used in pasting battery plates having certain apertures not designed to be filled with paste comprising a slab formed of two sections, one adapted to be superimposed upon the other, one of said sections having a flat upper face upon which the battery plate is adapted to be laid and having apertures therein corresponding to and registering with the said apertures in the battery plate which are not to be filled, the other section having projections formed to fill said apertures and normally projecting beyond the face of the first named section and into the said apertures of the battery plate when the battery plate is in place upon the slab to fill the last named aperturs, said projections and the apertures in the slab through which they pass being formed to provide clearance.

7. Means used in pasting battery plates having certain apertures not designed to be filled with paste comprising a slab formed of two sections, one adapted to be superimposed upon the other, one of said sections having a flat upper face upon which the battery plate is adapted to be laid and having apertures therein corresponding to and registering with the said apertures in the battery plate which are not to be filled, the other section having projections formed to fill said apertures and normally projecting beyond the face of the first named section and into the said apertures of the battery plate when the battery plate is in place upon the slab to fill the last named apertures, and means for limiting the movement of the sections away from each other to a distance permitting the sections to be shifted to a position where the ends of the projections are flush with the working face of the other section.

8. Means used in pasting battery plates having certain apertures not designed to be filled with paste comprising a slab formed of two sections, one adapted to be superimposed upon the other, one of said sections having a flat upper face upon which the battery plate is adapted to be laid and having apertures therein corresponding to and registering with the said apertures in the battery plate which are not to be filled, the other section having projections formed to fill said apertures and normally projecting beyond the face of the first named section and into the said apertures of the battery plate when the battery plate is in place upon the slab to fill the last named apertures, means for limiting the movement of the sections away from each other to a distance permitting the sections to be shifted to a position where the ends of the projections are flush with the working face of the other section, and manually operable means for shifting said sections toward or from each other.

9. Means used in pasting battery plates having certain apertures not designed to be filled with paste comprising a slab formed of two sections, one adapted to be superimposed upon the other, one of said sections having a flat upper face upon which the battery plate is adapted to be laid and having apertures therein corresponding to and registering with the said apertures in the battery plate which are not to be filled, the other section having projections formed to fill said apertures and normally projecting beyond the face of the first named section and into the said apertures of the battery plate when the battery plate is in place upon the slab to fill the last named apertures, means for limiting the movement of the sections away from each other to a distance permitting the sections to be shifted to a position where the ends of the projections are flush with the working face of the other section, and manually operable means for shifting said sections toward or from each other including levers pivotally connected to the sections.

10. Means used in pasting battery plates having apertures not designed to be filled with past comprising a slab having a smooth surface upon which the battery plate may be disposed and from which it may be shifted by edgewise movement, and means carried by said slab for removably filling the apertures in the battery plate not designed to be filled with paste.

In testimony whereof I affix my signature.

CHARLES CLAYTON RICH.